(12) United States Patent
Argue et al.

(10) Patent No.: US 9,330,382 B2
(45) Date of Patent: May 3, 2016

(54) METHOD TO FACILITATE AN IN-STORE AUDIT AFTER ISSUANCE OF AN ELECTRONIC RECEIPT

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 632 days.

(21) Appl. No.: 13/756,406

(22) Filed: Jan. 31, 2013

(65) Prior Publication Data

US 2014/0214574 A1 Jul. 31, 2014

(51) Int. Cl.
*G06G 1/12* (2006.01)
*G06Q 20/04* (2012.01)
*G06Q 30/06* (2012.01)
*G06Q 20/20* (2012.01)

(52) U.S. Cl.
CPC .......... *G06Q 20/0453* (2013.01); *G06Q 20/202* (2013.01); *G06Q 30/0635* (2013.01)

(58) Field of Classification Search
CPC .................. G06Q 30/0635; G06Q 20/202
USPC .................. 705/21, 26.81; 235/383
See application file for complete search history.

(56) References Cited

U.S. PATENT DOCUMENTS

| | | |
|---|---|---|
| 5,739,512 A | 4/1998 | Tognazzini |
| 6,226,618 B1 | 5/2001 | Downs |
| 6,341,353 B1 | 1/2002 | Herman |
| 6,487,540 B1 | 11/2002 | Smith |
| 6,543,683 B2 | 4/2003 | Hoffman |
| 6,913,193 B1 | 7/2005 | Kawan |
| 7,020,622 B1 | 3/2006 | Messer |
| 7,487,912 B2 | 2/2009 | Seifert |
| 7,797,192 B2 | 9/2010 | Mitchell |
| 8,392,258 B2 | 3/2013 | Kurihara |
| 2001/0029484 A1 | 10/2001 | Schultz |
| 2003/0055733 A1 | 3/2003 | Marshall |
| 2007/0164106 A1 | 7/2007 | McDevitt |
| 2009/0271265 A1 | 10/2009 | Lay |
| 2012/0041845 A1* | 2/2012 | Rothschild ............ G06Q 20/20 705/26.81 |

(Continued)

FOREIGN PATENT DOCUMENTS

| | | |
|---|---|---|
| CA | 2605944 A1 | 1/2008 |
| EP | 1195706 A2 | 4/2002 |

(Continued)

*Primary Examiner* — Hunter Wilder
(74) *Attorney, Agent, or Firm* — Howard & Howard Attorneys PLLC

(57) ABSTRACT

Techniques for allowing a store security associate to complete a purchase audit for a customer leaving a brick and mortar store are disclosed. The techniques include preparing an electronic receipt for completed purchase transaction and transmitting a copy of the electronic receipt to a store audit electronic device at the brick and mortar store. The techniques also include receiving customer information into the store audit electronic device to identify the copy of the electronic receipt associated with a customer, displaying the copy of the electronic receipt on the store audit electronic device, and reviewing the copy of the electronic receipt on the store audit electronic device to verify that the customer has purchased items which are in the customer's possession as the customer exits the store.

14 Claims, 11 Drawing Sheets

(56) References Cited

U.S. PATENT DOCUMENTS

2012/0084391 A1     4/2012   Patel  
2012/0280040 A1*   11/2012   Carney ............... G06Q 20/0453  
                                                                                          235/383

FOREIGN PATENT DOCUMENTS

GB    WO 2013008041 A1 *   1/2013   ........... G06Q 20/202  
WO       WO0075834 A2    12/2000  
WO       WO0207493 A2    1/2002

* cited by examiner

METHOD TO FACILITATE AN IN-STORE AUDIT AFTER ISSUANCE OF AN ELECTRONIC RECEIPT

BACKGROUND INFORMATION

1. Field of the Disclosure

The present invention relates to shopping at a retail location. In particular, examples of the present invention relate to an approach for facilitating in-store customer audits after electronic receipts are issued for purchase transactions.

2. Background

Many consumers visit supermarkets and stores for shopping. As consumers adopt emerging technologies such as smart phones or tablet computers, it is desirable to incorporate these technologies into shopping. Facilitating customer use of electronic shopping lists or providing electronic receipts, however, may not be sufficient as other post-purchase actions are more easily accomplished with paper receipts.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
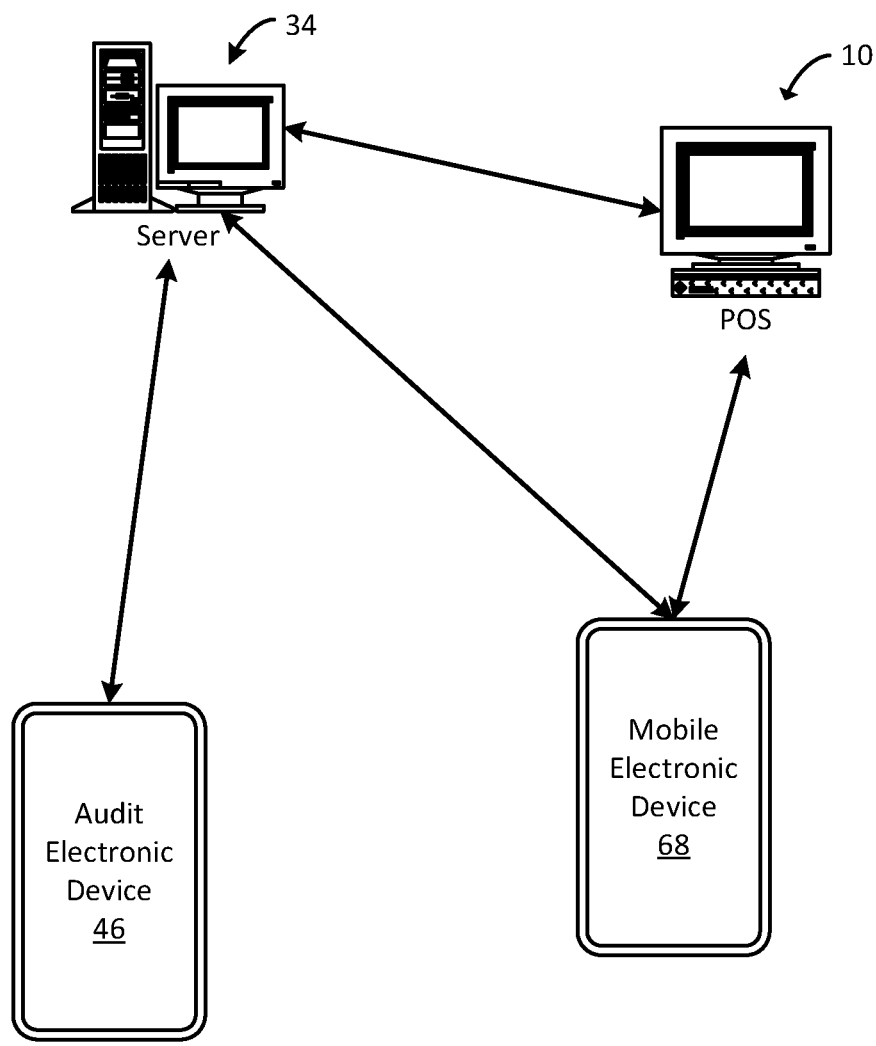
FIG. 1 is a schematic illustrating a mobile electronic device and an audit electronic device used in accordance with some aspects of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how employees at a brick and mortar store may interact with customers who have elected to receive electronic receipts. A customer may utilize a mobile electronic device such as a smart phone or a tablet computer while shopping. The customer may use an electronic list on their phone shopping to assist in collecting items and making a purchase. A customer may desire to use their mobile electronic device after shopping and may desire to receive electronic receipts on their mobile electronic device.

Referring to FIG. 1, a customer may shop in a brick and mortar store. The brick and mortar store may include a point of sale (POS) system 10 including cash registers or terminals, etc. and may also include a receipts management server 34. The customer may utilize a mobile electronic device 68 such as a smart phone or tablet computer while shopping. The customer may use the mobile electronic device 68 to interact with the store. In particular, the customer may have installed receipts management software on the mobile electronic device 68 which allows the customer to receive and mange electronic receipts on the mobile electronic device.

After making a purchase, the customer may receive an electronic receipt in place of a paper receipt. The POS terminal 10 may transmit purchase information to a receipts management server 34. The receipts management server 34 may receive the purchase information from the POS terminal 10 and may generate an electronic receipt. The server 34 may transmit the electronic receipt to the mobile electronic device 68.

The server 34 may also prepare a copy of the electronic receipt for use in store management. In particular, the server 34 may prepare a copy of the electronic receipt for use in conducting in-store audits. The server 34 may prepare a modified copy of the electronic receipt for use in conducting store audits. The server 34 may modify a receipt to provide a receipt which is modified to include identifying information such as a phone number of the mobile electronic device 68 used by the customer, a membership number of the customer, a transaction number, a receipt number, etc. This additional information may be included as part of the receipt, such as by providing the additional information as a text or character based portion of the receipt. This additional information may accompany the receipt, such as by providing the additional information as metadata or data otherwise associated with the receipt.

The server 34 may transmit the electronic receipt or a modified version of the electronic receipt to an audit electronic device 46. The audit electronic device 46 may be a portable electronic device such as a smart phone, tablet computer, laptop computer, etc. The audit electronic device 46 may be used by a store security associate who is responsible for conducting audits or otherwise responsible for ensuring that customers leaving the store with merchandise properly paid for that merchandise. The store security associate may use the audit electronic device 46 to receive the electronic receipts and to thereby verify that customers have properly purchased items before leaving the store.

Where customers receive electronic receipts on a mobile electronic device 68, there may be some delay in receiving the receipt. The electronic receipt may often be delivered to the mobile electronic device 68 via the device's network coverage. In some cases, the mobile electronic device 68 may have slow network data coverage at the store location or may have no coverage in this location. Where a customer is on vacation, for example, they may be outside of their network data coverage and may not have data coverage available or may not desire to pay for data usage outside of their own network. In some cases, a customer may have a mobile electronic device 68 which is not charged or which has a lapse in data coverage. In situations such as these, the customer may not receive an electronic receipt immediately after completing a purchase.

A store security associate may perform an audit for such a customer by checking the purchased items against the receipts transmitted to the audit electronic device 46. Where the audit electronic device receives a modified electronic receipt or an electronic receipt which otherwise has additional customer and transaction identifying information associated therewith, the security associate may obtain information from the customer such as the telephone number of their mobile electronic device 68, their store member number, or a transaction identification number associated with the purchase (i.e. a TC number). The security associate may enter this information into the audit electronic device 46 to locate and view the receipt for the customer's purchase. In this manner, a store security associate may complete a purchase audit or verify that particular items have been paid for where a customer has elected to receive electronic receipts instead of paper receipts.

Various parts of a POS system and receipts management system may allow customers to receive electronic receipts on a mobile electronic device and to demonstrate purchase of an item if requested by a store security associate. Various parts and structures are described to illustrate how these may allow a store security associate to complete an audit of a purchase where a customer did not receive a paper receipt.

Figure 2:
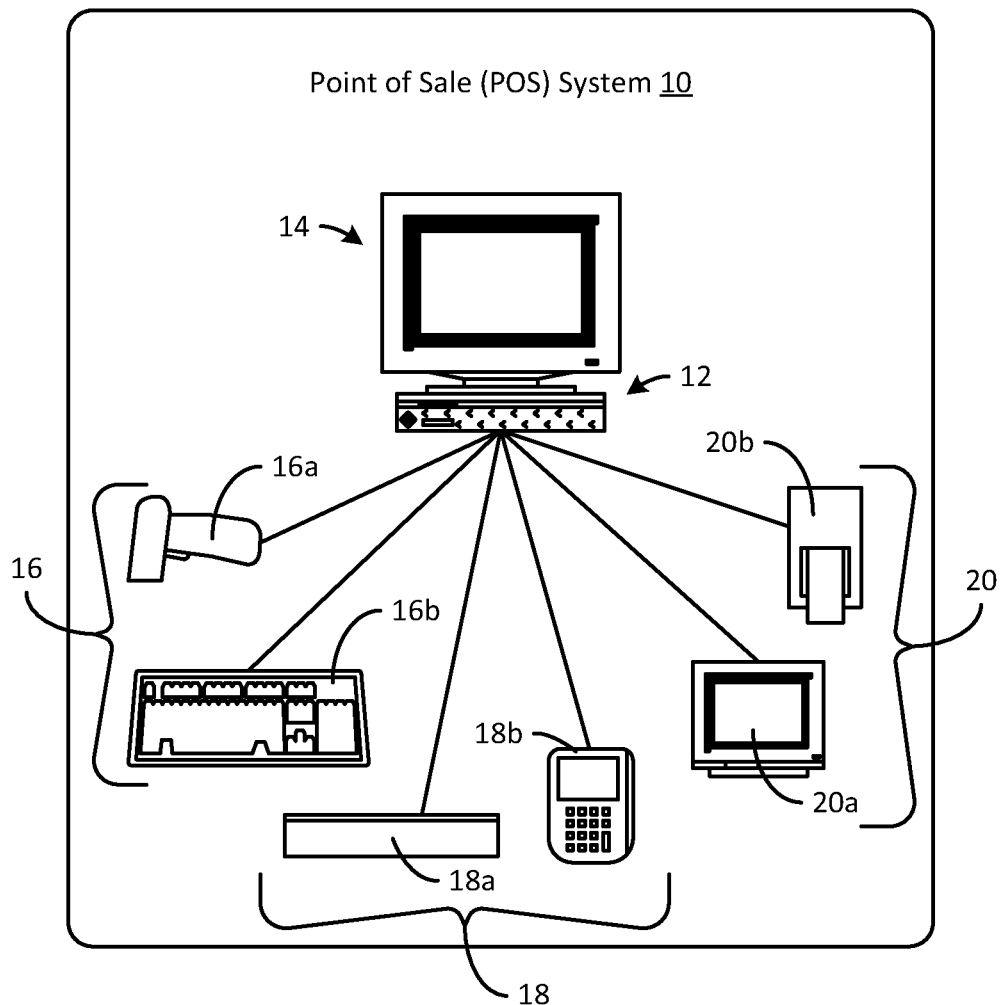
FIG. 2 is a schematic illustrating a POS system used in accordance with some aspects of the present disclosure.

Referring to FIG. 2, in selected embodiments, the hardware, software, or hardware and software of a POS system 10 may be configured to implement one or more embodiments described herein. For example, a POS system 10 may be manufactured, programmed, modified, or upgraded to support communications with mobile electronic devices 68 and audit electronic devices 46 and to thereby facilitate purchase audits where a customer did not receive a paper receipt. It is appreciated that the POS system may involve one or more parts of a local POS terminal and associated computers or servers, remote computers or servers, customer devices such as a mobile electronic device, and associated equipment.

A POS system 10 may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support communications with mobile electronic devices 68, inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 may include an accounting interface to pass certain information to one or more in-house or independent accounting applications. A POS system 10 may also communicate with third parties and may transmit receipt information and facilitate customer management of receipts.

Figure 3:
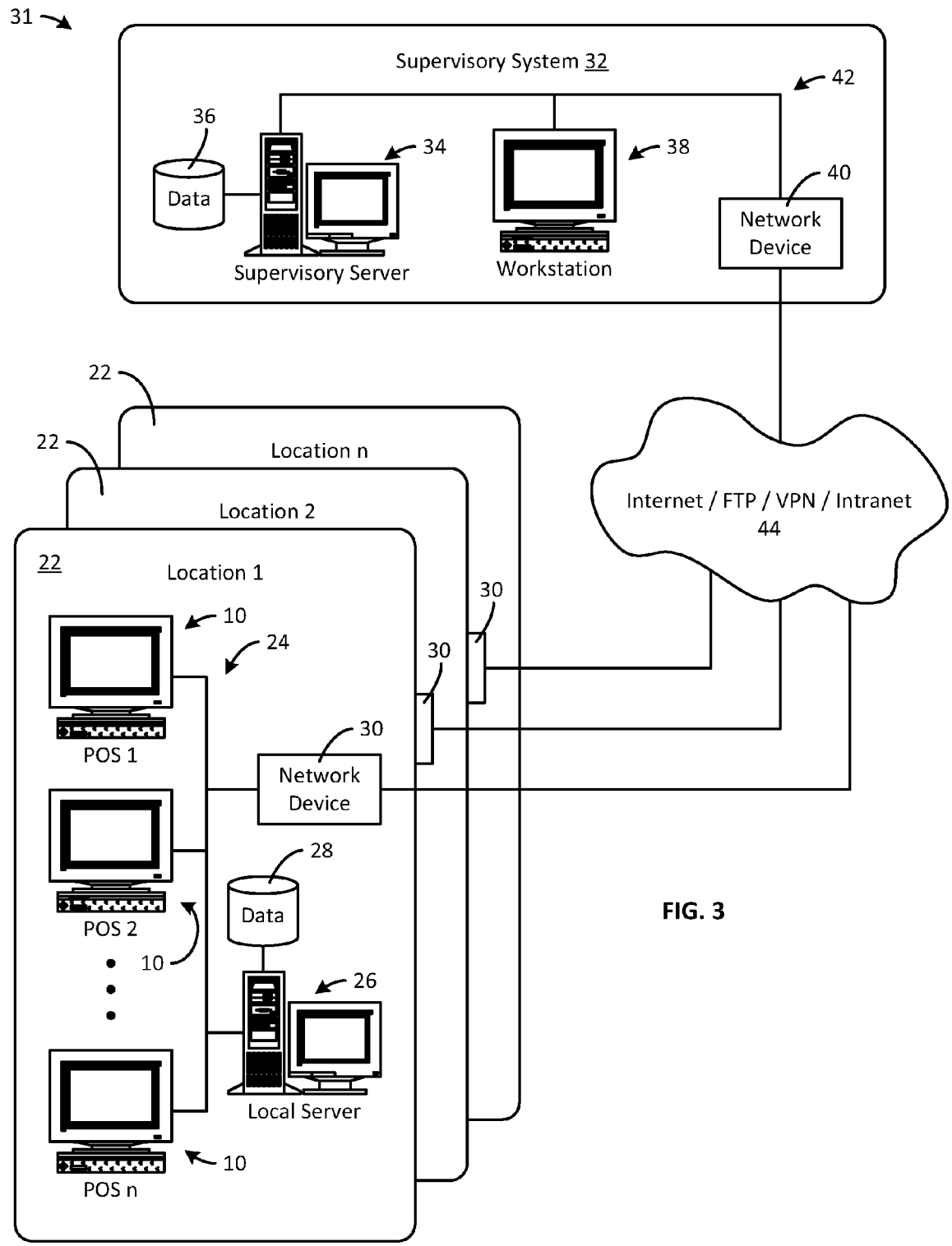
FIG. 3 is a schematic illustrating a POS system used in accordance with some aspects of the present disclosure.

Referring to FIG. 3, in selected embodiments, a POS system 10 may operate substantially independently, as a stand-alone unit. Alternately, a POS system 10 may be one of several POS systems 10 forming the front line of a larger system. For example, multiple POS systems 10 may operate at a particular location 22 (e.g., within a brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

It is thus appreciated that in discussing the functionality of the various POS terminals and servers, the embodiments described herein may be implemented in a system contained within a single location or across multiple locations. By way of example, the functionality accomplished by a server or computer, such as storing, processing, and transmitting/sending receipt information, may be accomplished by a local computer or a remote computer such as servers 26 and 34.

Figure 4:
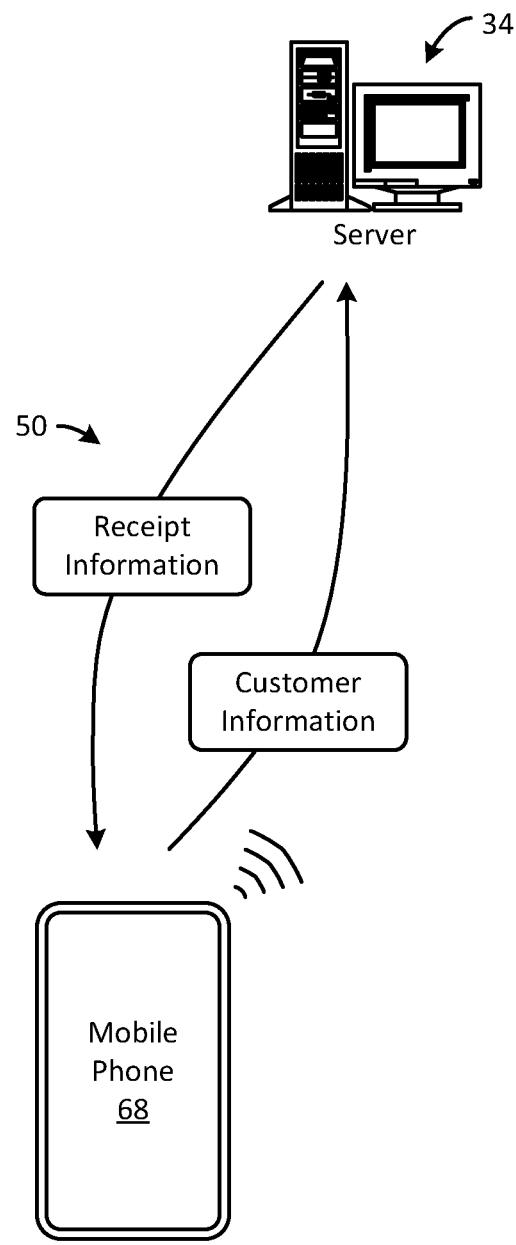
FIG. 4 is a schematic illustrating a mobile electronic device used in accordance with some aspects of the present disclosure.

Referring to FIG. 4, a customer may use a mobile electronic device 68 while shopping. The mobile electronic device may be a mobile phone such as a smart phone, a tablet computer, etc. In many instances, the mobile electronic device 68 is a mobile phone. The customer may download or may already have downloaded receipts management software to a mobile electronic device 68. A customer may have previously received an invitation to download and use receipts management software from a paper receipt, friend, in-store advertisement, website, etc. and may have installed receipts management software on the mobile electronic device 68.

As indicated at 50, the customer may have created an account with a receipts/shopping server 34 (or server 26) and may transmit information to the server 34. The computer server 34 may likewise transmit information to the mobile device 68. In particular, the customer may create an account with the receipts management server 34 which includes information such as a preference to receive electronic receipts instead of paper receipts and which includes identifying information for a mobile electronic device 68 to receive an electronic receipt. Particularly, the account may include the telephone number for a mobile electronic device 68. Such an account may facilitate communication between the receipts management server and the customer's mobile electronic device 68 and may make it easy for a customer to receive electronic receipts on the mobile electronic device.

The customer may receive receipts management software on the mobile device 68 which may enable them to manage their in-store shopping experience with their mobile electronic device. Additionally, the receipts management software may allow the customer to interact with a POS system 10 via the mobile electronic device 68. The server 34, server 26, or other devices may facilitate communication with the mobile electronic device 68 and between the mobile electronic device 68 and the POS terminal 10.

Figure 5:
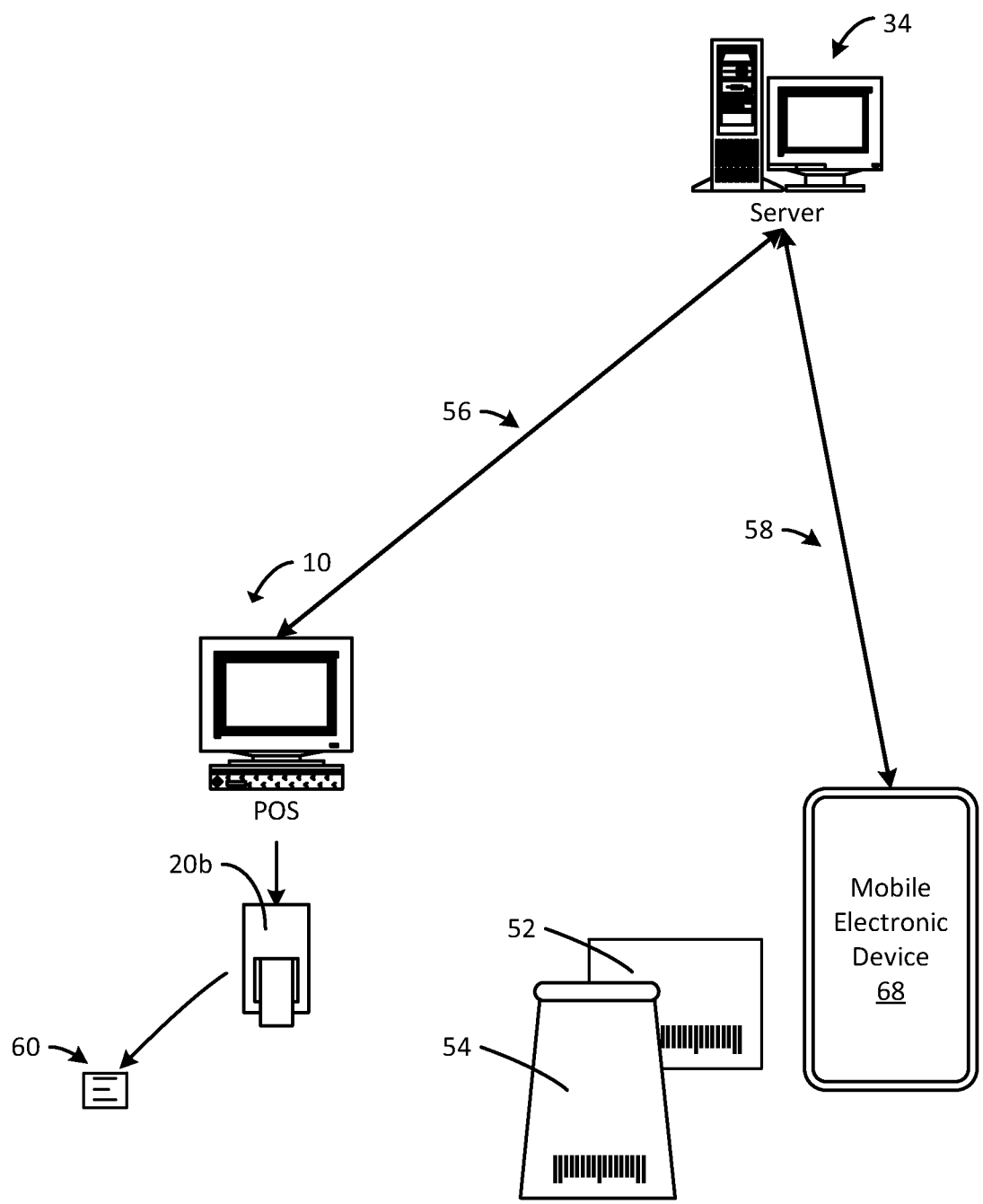
FIG. 5 is a schematic illustrating a mobile electronic device and a point of sale system used in accordance with some aspects of the present disclosure.

Referring now to FIG. 5, a customer may select various items 52, 54 while shopping at a brick and mortar store. When the customer is finished selecting items, the customer will typically bring the items 52, 54 to a POS terminal 10 to checkout and purchase the items. Different POS terminals 10 including self-checkout registers and conventional cashier assisted registers may be used to complete the purchase. The customer may have elected to receive electronic receipts on a mobile electronic device 68. As such, the POS terminal may not print a conventional paper receipt. The POS terminal 10 may transmit information regarding the purchase transaction to a receipts management server 34 as indicated at 56. The receipts management server 34 may prepare an electronic receipt for the transaction. The receipts management server 34 may prepare an electronic receipt and transmit the electronic receipt to the mobile electronic device 68 as indicated at 58. The POS terminal 10 may print a stub receipt 60 for the customer after completing the purchase transaction. The stub receipt 60 may include a few key items of information about the transaction but typically does not include all of the items which were purchased and typically does not include all of the information provided on a typical receipt.

Figure 6:
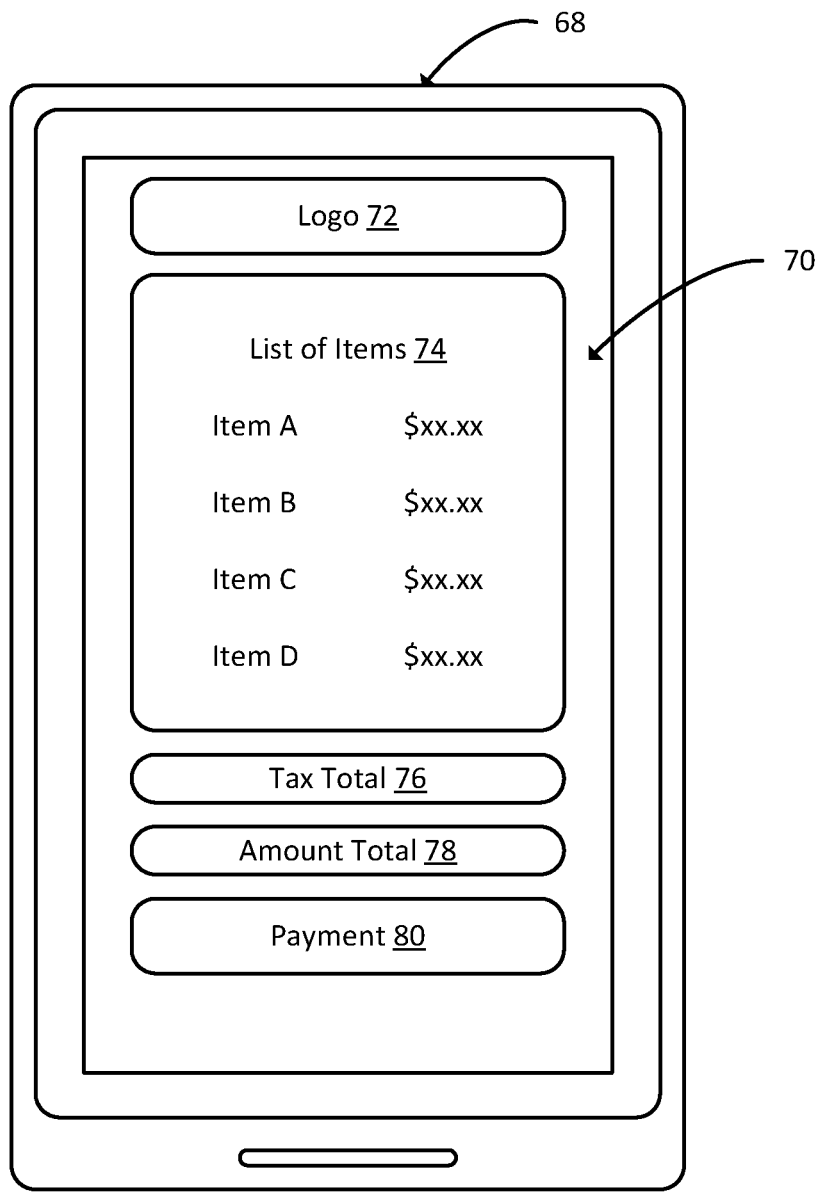
FIG. 6 is a drawing illustrating a mobile electronic device used in accordance with some aspects of the present disclosure.

Referring now to FIG. 6, an electronic receipt 70 may be prepared by the receipts management server 34 and transmitted to a customer on a mobile electronic device 68. The electronic receipt 70 may be similar to a conventional paper receipt in many ways. As such, the electronic receipt 70 may often include a store logo 72 and associated contact information for the store. The electronic receipt may also include a list of items 74 which were purchased, taxes 76 applicable to the purchase, a total amount 78 for the purchase, and payment information 80 related to the purchase. The electronic receipt 70 is similar in many ways to a conventional paper receipt.

Figure 7:
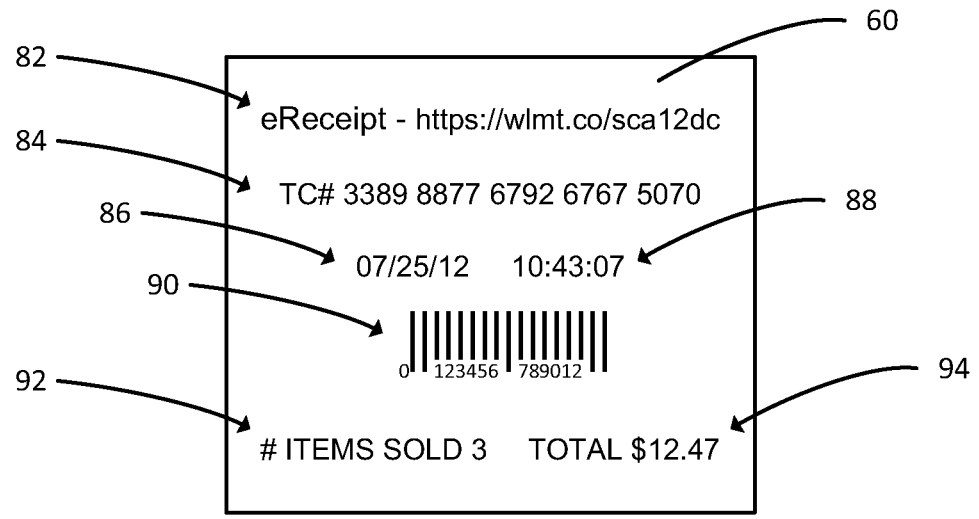
FIG. 7 is a drawing illustrating a stub receipt used in accordance with some aspects of the present disclosure.

Referring now to FIG. 7, the POS terminal 10 may print a stub receipt 60 for a customer who has elected to receive electronic receipts. The stub receipt may be useful as it serves as a reminder to the customer that they will receive an electronic receipt for the transaction and may server as an indicator to a sales associate that the purchase transaction has been completed. The stub receipt 60 may often have a few pieces of information contained thereon. The stub receipt 60 may include a web address 82 where a customer may download or obtain a copy of the electronic receipt, such as via a mobile electronic device 68 which has an account with the receipts management server 34. The stub receipt 60 may also include a transaction identification number 84 corresponding to the purchase transaction. This transaction number 84 may be a number which is always associated with that particular transaction through a store's computer systems and may uniquely identify that transaction.

The stub receipt 60 may also include the date 86 and time 88 of the purchase, and may include a machine readable code 90 such as a barcode which identifies the transaction in a convenient machine readable format. The stub receipt 60 may also include the number of items sold 92 for the transaction and the total amount 94 of the transaction.

Figure 8:
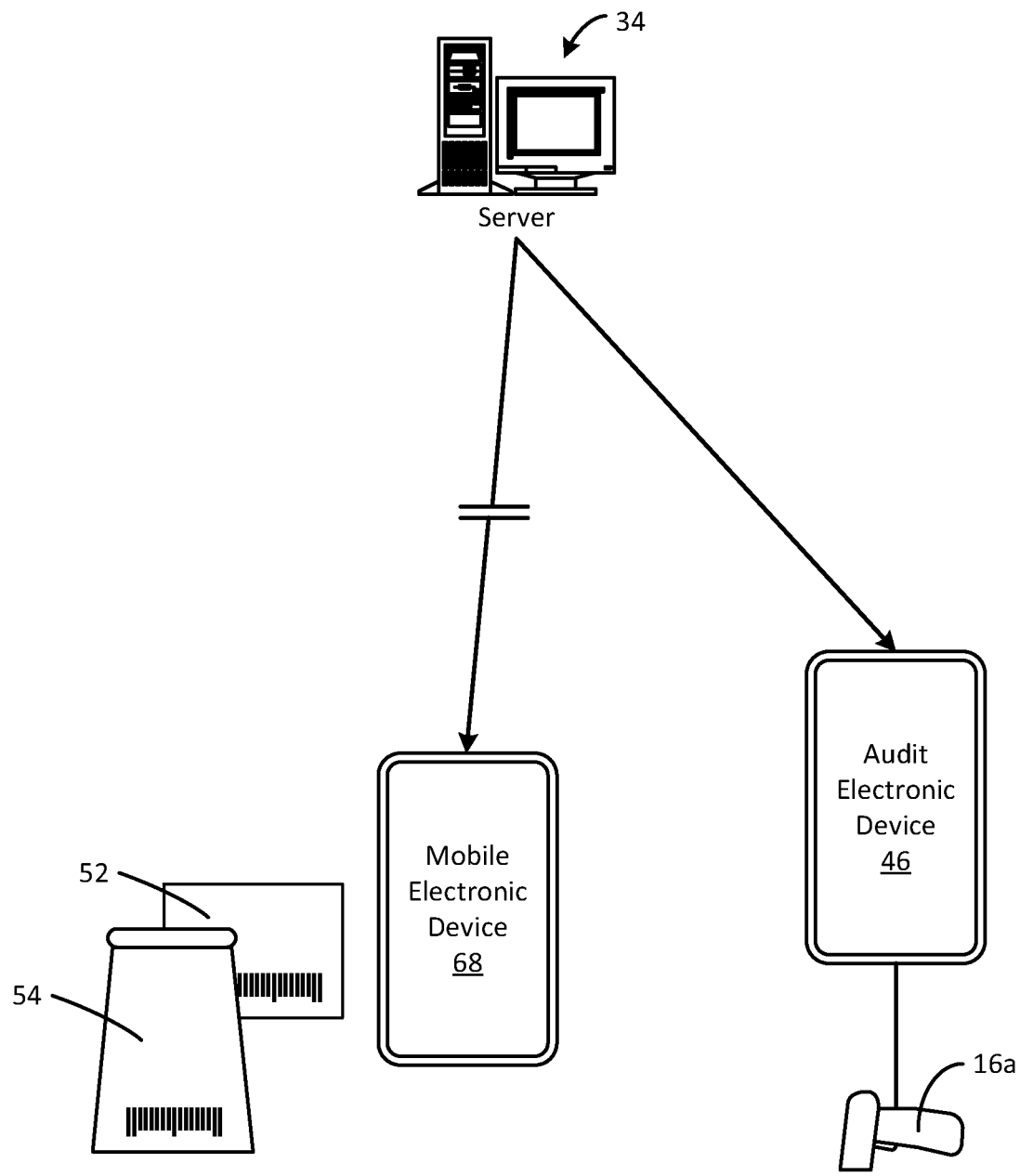
FIG. 8 is a schematic illustrating a mobile electronic device and an audit electronic device used in accordance with some aspects of the present disclosure.

Referring now to FIG. 8, a customer will typically exit a store with the purchased items 52, 54 relatively quickly after completing a purchase. As discussed, a customer may have not yet received an electronic receipt 70 for various reasons including a slow or non-existent network connection for their mobile electronic device 68. As such, the customer may not have a receipt to show if requested to provide evidence of the purchase. The receipts management server 34 may thus send a copy of the electronic receipt 70 to an audit electronic device 46. The audit electronic device 46 may be a smart phone, tablet computer, etc.

The store may maintain a fast connection to the audit electronic device 46 such as providing a WIFI connection for the device 46. As such, the audit electronic device 46 may have received the electronic receipt 70 prior to the customer exiting the store. The audit electronic device 46 may receive all of the electronic receipts which are generated at the store as the associated transactions are completed. In addition to the electronic receipt, the audit electronic device 46 may receive additional information associated with the receipt. The audit electronic device 46 may receive the customer's member number for stores which have a membership, the customer's mobile electronic device telephone number, the transaction identification number, etc. The audit electronic device may receive this additional information as data or metadata associated with the electronic receipt 70 and may receive this information in a data or text/character format which is useful for searching and computer processing, allowing the information to be used to quickly lookup an electronic receipt on the audit electronic device 46.

When a customer is leaving the store and an audit is desired to verify that the customer purchased the items 52, 54 in the customer's possession, a store security associate may ask the customer for one of several pieces of identifying information including the mobile electronic device telephone number, a membership number, the purchase amount, or the transaction identification number associated with the receipt (and which may be present on a stub receipt). The customer may give one of these pieces of information to the associate and the security associate may enter the information into the audit electronic device 46.

The audit electronic device 46 may provide a dropdown box or an autocomplete list of matching receipts as the store security associate enters in the information provided by a customer, allowing the associate to quickly narrow down and select a desired receipt from those electronic receipts which have been transmitted to the audit electronic device 46. If the customer provides information for a receipt which is not stored on the audit electronic device 46, the device 46 may request the corresponding receipt from the receipts management server 34. As such, the audit electronic device 46 may maintain an authenticated connection with the receipts management server 34.

The security associate may be provided with a scanner 16*a* similar to those used at a POS terminal 10. The scanner 16*a* may be used to scan a machine readable code from a stub receipt 60 to identify the transaction and view the electronic receipt on the audit electronic device 46. As an alternative to a scanner, a security associate may use the camera on the audit electronic device 46 to capture a machine readable code 90 or to capture and recognize a member number from a member card. The security associate may most commonly obtain a customer's member number, telephone number, or scan in a machine readable code 90 from a stub receipt 60 to locate and view the electronic receipt associated with the customer purchase. The security associate thus may view an electronic receipt quickly and easily.

The audit electronic device 46 may store and present electronic receipt information in a manner which reduces the time required to locate and view a receipt, reducing the inconvenience to a customer. The audit electronic device 46 may receive electronic receipts as transactions are completed and may eliminate electronic receipts which are older than a predetermined amount of time. As such, the audit electronic device may store all electronic receipts in the last 30 minutes. In this manner, the audit electronic device 46 stores a more limited amount of data and can quickly search through the electronic receipts and display the electronic receipts. The audit electronic device 46 will likely have all relevant electronic receipts as customers leave the store following a purchase. Where the audit electronic device 46 does not have an electronic receipt which is needed, the device 46 may request the electronic receipt from the receipts management server 34 through an authenticated connection.

The electronic receipts may be presented to the store security associate in a chronological order having the most recent receipts presented first. As a security associate enters information to locate a receipt, the audit electronic device 46 may provide a list of potentially matching receipts and these may be presented in chronological order with the newest receipts first, assisting the security associate in quickly identifying the electronic receipt associated with the customer's purchase. The electronic receipts may be stored in the audit electronic device 46 with additional data or with/in a text or characterized form, allowing a store security associate to enter any piece of information from the electronic receipt into the audit electronic device to identify and view the desired electronic receipt. In this manner, the store security associate can quickly perform a purchase audit for customers leaving the store.

Figure 9:
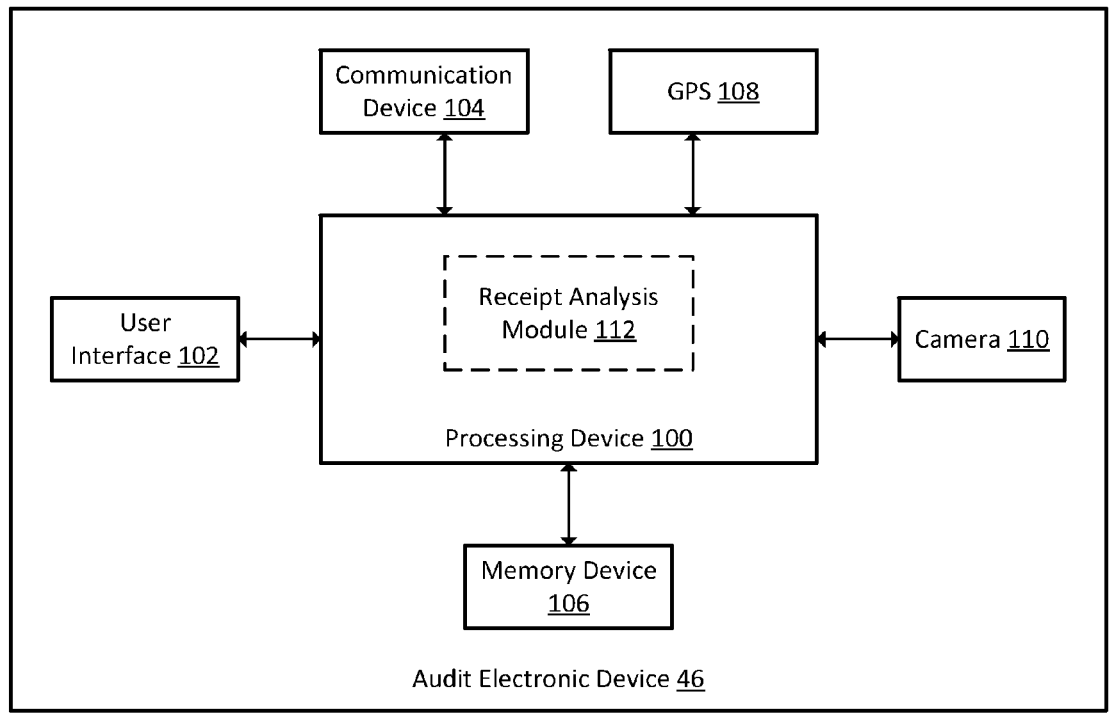
FIG. 9 is a schematic illustrating example components of an audit electronic device.

Referring now to FIG. 9, a schematic illustrating example components of the audit electronic device 46 of FIG. 1 is illustrated. In the illustrative embodiment, the audit electronic device 46 includes a processing device 100, a user interface 102, a communication device 104, a memory device 106, a global positioning system (GPS) 108, and a camera 110. It is noted that the audit electronic device 46 can include other components and some of the components are not required.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the audit electronic device 46. In the illustrative example, the processing device 100 also executes a receipt analysis module 112 which is described in greater detail below.

The user interface 102 is a device that allows a user, and a store security associate in particular, to interact with the audit electronic device 46. While one user interface 102 is shown, the term "user interface" can include, but is not limited to, a touch screen, a physical keyboard, a mouse, a microphone, and/or a speaker. The communication device 104 is a device that allows the audit electronic device 46 to communicate with another device, e.g., the server 34 or a mobile electronic device. The communication device 104 can include one or more wireless transceivers for performing wireless communication and/or one or more communication ports for performing wired communication. The memory device 106 is a device that stores data generated or received by the audit electronic device 46. The memory device 106 can include, but is not limited to, a hard disc drive, an optical disc drive, and/or a flash memory drive.

The GPS 108 determines a location of the audit electronic device 46 by communicating with a plurality of GPS satellites. The GPS 108 can perform known triangulation techniques to determine the GPS coordinates of the mobile electronic device 68. It should be appreciated that while a GPS 108 is shown, any other suitable component for determining the location of the audit electronic device 46 can be implemented.

The camera 110 is a digital camera that captures a digital photograph or video. The camera 110 receives an instruction to capture an image such as an image of a machine readable code 90 from a stub receipt 60, or a member number from a customer membership card. The camera 110 may capture an image of the object and output the captured image. The camera 110 can receive the instruction to capture the image from the processing device 100 and can output the digital photograph to the processing device 100. The processing device 100 may process the captured image to identify a receipt related to a particular customer who is exiting a store after a purchase. The processing device may obtain receipt information from the machine readable code or from a membership number to identify the receipt and associated transaction and allow a store security associate to verify a customer's purchase as the customer exits the store.

The receipt analysis module 112 allows a user, a store security associate in particular, to analyze electronic receipts which are stored on an audit electronic device 46. The receipt analysis module 112 may order electronic receipts chronologically for easy access. The receipt analysis module may allow a security associate to search through electronic receipts to identify a receipt associated with a customer. Particularly, the receipt analysis module 112 may allow the security associate to search for a receipt number, transaction identification number, customer member number, customer telephone number associated with an electronic receipt, etc. to identify the electronic receipt associated with the customer's recent purchase. The receipt analysis module 112 may search through metadata associated with an electronic receipt or text based information associated with an electronic receipt to identify a desired electronic receipt. The receipt analysis module 112 may receive images from the camera 110 and may use information obtained from the camera image to search through electronic receipts and identify a desired electronic receipt associated with a customer who is exiting the store after a purchase.

Figure 10:
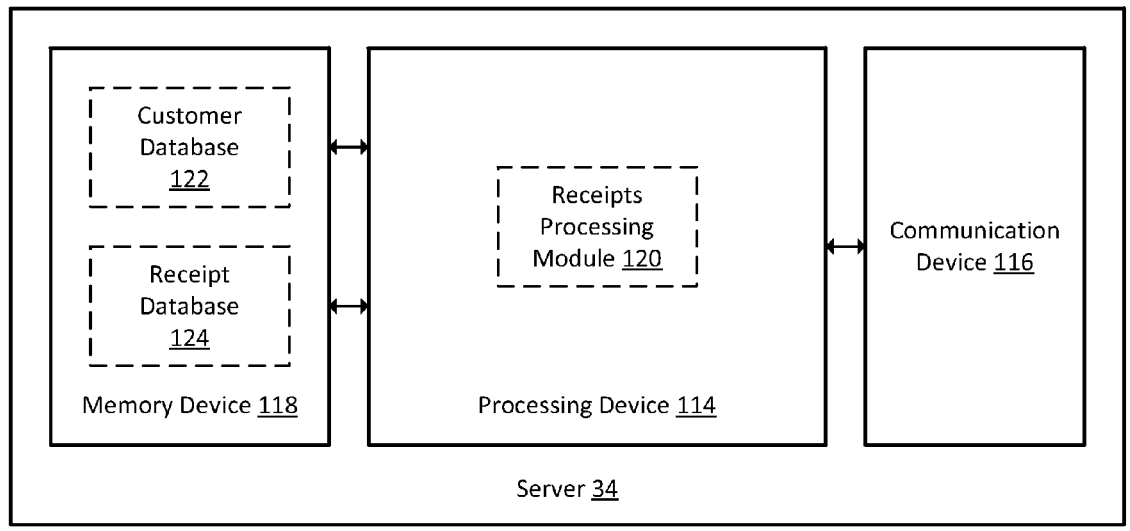
FIG. 10 is a schematic illustrating example components of a server.

As referenced above, the server 34 may be configured to perform one or more functions at the request of the mobile electronic device 68, POS terminal 10, or audit electronic device 46. FIG. 10 illustrates an example embodiment of the server 34 configured to perform one or more of the requested functions. In the illustrated embodiment, the server 34 may include a processing device 114, a communication device 116, and a memory device 118.

The processing device 114 can include memory, e.g., read only memory (ROM) and random access memory (RAM), storing processor-executable instructions and one or more processors that execute the processor-executable instructions. In embodiments where the processing device 114 includes two or more processors, the processors can operate in a parallel or distributed manner. In the illustrative embodiment, the processing device 114 executes a receipts processing module 120.

The communication device 116 is a device that allows the server 34 to communicate with another device, e.g., the audit electronic device 46. The communication device 116 can include one or more wireless transceivers for performing wireless communication and/or one or more communication ports for performing wired communication.

The memory device 118 is a device that stores data generated or received by the server 34. The memory device 118 can include, but is not limited to a hard disc drive, an optical disc drive, and/or a flash memory drive. Further, the memory device 118 may be distributed and located at multiple locations. The memory device 118 is accessible to the processing device 114. In some embodiments, the memory device 118 stores a customer database 122 and a receipt database 124.

In some embodiments, the customer database 122 can store information associated with a customer. The customer database may, for example, store information associated with a customer account and may include account preferences and customer contact information such as a mobile electronic device telephone number or member number associated with a particular customer. The customer database may be queried by the processing device 114 and may provide information to the processing device to facilitate identifying customers and to facilitate identifying receipts associated with customers.

In some embodiments, the receipt database 124 stores electronic receipt information for purchases made in the brick and mortar store. For example, the receipt database 124 may store the electronic receipts and may store additional information associated with the electronic receipts. By way of example, the receipt database 124 may be queried by the processing device 114 and may transmit information to the processing device to facilitate the use or transmission of an electronic receipt.

The processing device 114 may execute the receipts processing module 120. The receipts processing module may receive electronic receipts from purchases made at the brick and mortar retail store. The receipts processing module may facilitate the use of these receipts by an audit electronic device 46. In particular, the receipts processing module may associate additional information with the electronic receipt, such as by associating the customer mobile electronic device telephone number, customer member number, receipt transaction identification number, receipt barcode number, etc. with the receipt. Such information may be associated as metadata or may be saved as electronically searchable data within the electronic receipt. The electronic receipt may be sent to the audit electronic device 46 via the communication device 116 and may then be used to identify a receipt associated with a customer that is exiting the brick and mortar store to verify that the customer has purchased the items in the customer's possession.

Figure 11:
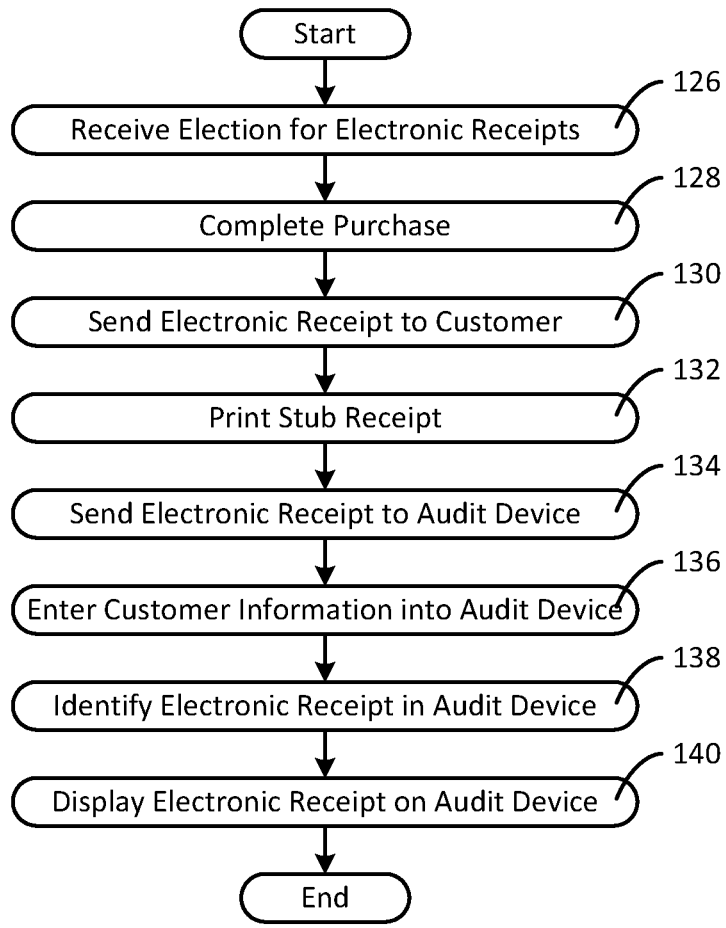
FIG. 11 is a flow chart illustrating an exemplary security audit according to aspects of the present disclosure.

FIG. 11 generally illustrates verifying a customer purchase at a brick and mortar store. A customer may have elected to receive electronic receipts 126 on a mobile electronic device 68. Thereafter, the customer may complete a purchase 128 at the brick and mortar store. As the customer desires to receive an electronic receipt 70, the server 34 may send 130 an electronic receipt 70 to a mobile electronic device 68 associated with the customer. The POS terminal 10 may print 132 a stub receipt 60 for the customer. The server 34 may send 134 a copy of the electronic receipt 70 to an audit electronic device 46. The electronic receipt 70 sent to the audit electronic device 46 may be modified to include additional data or electronically searchable data as discussed to allow for easy searching and identification of a desired receipt.

As the customer is leaving the store, the audit electronic device 46 may be used to identify the electronic receipt 70 which is associated with the customer's purchase. Particularly, data associated with the customer such as a mobile electronic device telephone number, membership number, receipt identification number, etc. may be entered 136 into the audit electronic device 46. Using this information, the desired electronic receipt 70 may be identified 138 in the audit electronic device 46. Thereafter, the electronic receipt 70 may be displayed 140 on the audit electronic device 46. The electronic receipt 70 may then be used by a security associate at the brick and mortar store to verify that the customer has purchased items in the customer's possession.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
receiving notification that a customer has installed a receipts management application associated with a retailer on a mobile electronic device;
prompting, by the application, the customer to provide at least one piece of identifying information corresponding to the customer, wherein the identifying information is stored in a customer database;
prompting, by a sales terminal of the retailer, the customer to provide the at least one piece of identifying information;
sending, by the sales terminal to a receipts management server, the at least one piece of identifying information;
identifying, by the receipts management server, the customer in the customer database based on the at least one piece of identifying information;
facilitating, by the sales terminal, a purchase transaction by the customer;
preparing, at the receipts management server, an electronic receipt for the purchase transaction;
sending, by the receipts management server to the sales terminal, the electronic receipt;
printing, at the sales terminal, a paper stub receipt containing a machine-readable code identifying the purchase transaction and associated with the electronic receipt, wherein the paper stub receipt is provided to the customer;
preparing, at the receipts management server, a modified copy of the electronic receipt, wherein the modified copy of the electronic receipt has additional customer and transaction identifying information for use in conducting store audits and is stored in a receipt database at the receipts management server;
transmitting, by the receipts management server, the modified copy of the electronic receipt to an audit electronic device;
scanning, by the audit electronic device, the machine-readable code of the paper stub receipt;

identifying, by the audit electronic device, the purchase transaction based on the machine-readable code;

displaying, by the audit electronic device, the modified copy of the electronic receipt; and automatically eliminating the modified copy of the electronic receipt from the audit electronic device after a predetermined period of time.

2. The method of claim 1, wherein the method further comprises sending, by the receipts management server, the electronic receipt to the customer mobile electronic device.

3. The method of claim 1, wherein the modified copy of the electronic receipt further includes text searchable information associated with the customer to facilitate identification of the modified copy of the electronic receipt.

4. The method of claim 1, wherein the method further comprises receiving a customer telephone number corresponding to a mobile electronic device into the audit electronic device to identify the modified copy of the electronic receipt associated with the customer.

5. The method of claim 1, wherein the method further comprises receiving a store member number associated with the customer into the audit electronic device to identify the modified copy of the electronic receipt associated with the customer.

6. The method of claim 5, wherein the method further comprises capturing an image of a store membership card associated with the customer via the audit electronic device and optically recognizing the member number.

7. The method of claim 1, wherein the paper stub receipt does not include purchased items associated with the electronic receipt.

8. A computer system comprising:
an application installed on a communication device associated with a customer programmed to:
receive information regarding a purchase transaction at a brick and mortar store, and
prompt the customer to provide at least one piece of identifying information, wherein the identifying information is stored in a customer database;
a sales terminal programmed to send, to a receipts management server, the at least one piece of identifying information;
the receipts management server programmed to:
identify the customer in the customer database based on the at least one piece of identifying information,
prepare an electronic receipt for the purchase transaction, and
send the electronic receipt to the sales terminal, and
the sales terminal further programmed to print a paper stub receipt containing a machine-readable code identifying the purchase transaction and associated with the electronic receipt, wherein the paper stub receipt is provided to the customer;
the receipts management server is further programmed to:
prepare a modified copy of the electronic receipt, wherein the modified copy of the electronic receipt has additional customer and transaction identifying information for use in conducting store audits and is stored in a receipt database at the receipts management server, and
transmit the modified copy of the electronic receipt to an audit electronic device at the brick and mortar store;
an audit electronic device user interface programmed to:
scan the machine-readable code of the paper stub receipt,
identify the purchase transaction based on the machine-readable code,
display the modified copy of the electronic receipt on the store audit electronic device, and
automatically eliminate the modified copy of the electronic receipt from the audit electronic device after a predetermined period of time.

9. The system of claim 8, wherein the receipts management server is further programmed to send the electronic receipt to the communication device.

10. The system of claim 8, wherein the modified copy of the electronic receipt further includes text searchable information associated with the customer to facilitate identification of the copy of the electronic receipt.

11. The system of claim 8, wherein the audit electronic device is further programmed to:
receive a customer telephone number corresponding to the communications device.

12. The system of claim 8, wherein the audit electronic device is further programmed to:
receive a store member number associated with the customer.

13. The system of claim 12, further comprising an audit electronic device processing device programmed to:
capture an image of a store membership card associated with the customer via an audit electronic device camera and optically recognize the member number.

14. The system of claim 8, wherein the
paper stub receipt does not include purchased items associated with the electronic receipt.

* * * * *